H. AND S. A. DITTMANN AND R. C. SIMMONSEN.
LOCKING DEVICE FOR AUTOMOBILES AND THE LIKE.
APPLICATION FILED AUG. 17, 1918.
1,377,757. Patented May 10, 1921.
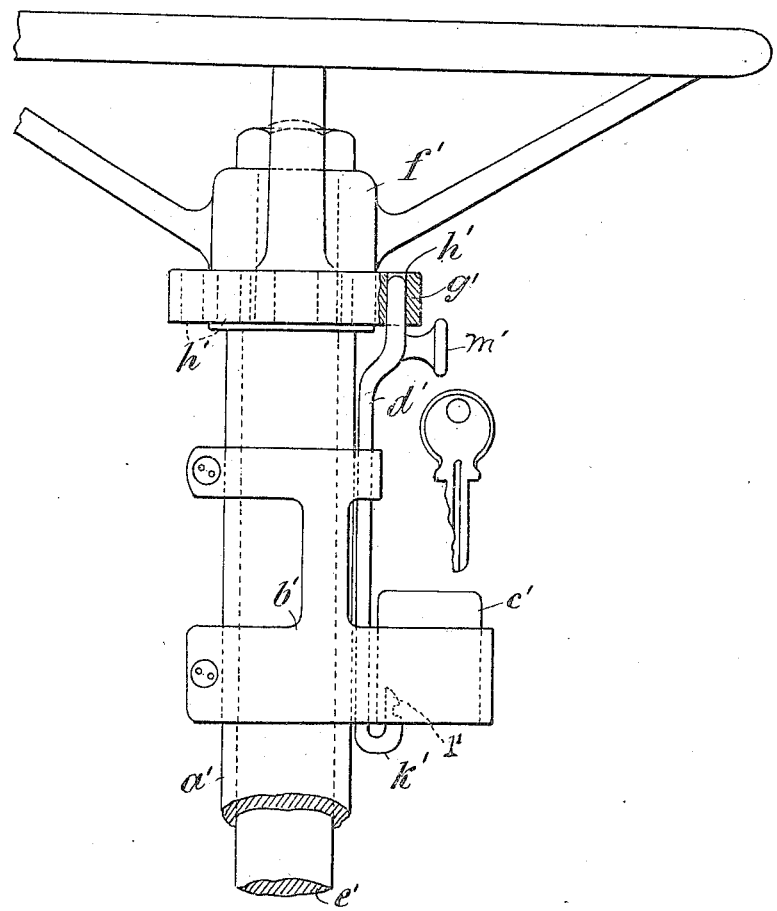

UNITED STATES PATENT OFFICE.

HALFDAN DITTMANN, SVEND AAGE DITTMANN, AND ROBERT CHARLES SIMMONSEN, OF COPENHAGEN, DENMARK.

LOCKING DEVICE FOR AUTOMOBILES AND THE LIKE.

1,377,757.    Specification of Letters Patent.    Patented May 10, 1921.

Application filed August 17, 1918. Serial No. 250,271.

*To all whom it may concern:*

Be it known that we, HALFDAN DITTMANN, SVEND AAGE DITTMANN, and ROBERT CHARLES SIMMONSEN, subjects of the King of Denmark, residing at Copenhagen, Denmark, have invented new and useful Improvements in Locking Devices for Automobiles and the like; and we do hereby declare the following to be a full, clear, and exact description of the same.

The invention relates to an automatically locking device for locking of the steering pillar or handle bar of automobiles and the like, for preventing theft of the same.

The locking device is of the kind including a cylinder lock constructed to be arranged in fixed connection with one of the two members, the mutual position of which is to be secured, viz., the steering apparatus or steering member and steering pillar or some other stationary part of the vehicle or the boat. Further the locking device is of the kind in which the cylinder lock co-acts with a displaceable locking rod which is guided on one of the said members, and particularly on that member, to which the cylinder lock is secured.

The novelty in the invention consists in a member provided with a plurality of circumferentially distributed apertures, notches or the like being fastened to the other of the said members, the mutual position of which is to be secured, one end of the said locking rod engaging one of the said apertures or notches when the locking rod is moved to engage the cylinder lock. The invention is thus characterized by but one single manipulation being demanded for locking as well as for releasing of the steering apparatus. In order to effect locking, a hook on the movable arm or displaceable locking rod is pressed up into the cylinder lock by hand or otherwise and is then automatically locked in the well known manner, and the releasing takes place in the simple manner that the key is put into the lock and turned, whereby the hook on the locking rod is released from the cylinder lock. The locking rod will then automatically fall down owing to gravity.

In the drawing is shown a preferred embodiment of the invention especially for automobiles or motor-boats.

On the stationary tube-shaped part $a'$ of the steering-post is fastened a clip $b'$, to which is fastened a cylinder-lock $c'$. The clip $b'$ forms the guide for a displaceable locking rod $d'$, which can be brought to co-act with a part fastened on the movable steering stem $e'$ in order to lock the steering stem in relation to the tube-shaped part $a'$. For this purpose a ring $g'$ provided with a row of axial holes $h'$ may be fastened to the steering wheel $f'$. The lowermost bent end $k'$ of the locking rod $d'$ has a hook $l'$ which in a well known manner can coact with and be retained by a movable spring actuated bolt arranged in the cylinder lock, but not shown in the drawing.

When the wheel is to be locked the locking rod $d'$ is lifted up by the handle $m'$ in such a manner that its uppermost end enters a hole in the ring $g'$, and at the same time the locking rod $d'$ is retained by the hook $l'$ meshing with the movable spring actuated bolt in the lock $c'$. As soon as this lock is unlocked, the locking rod falls down owing to its weight and hereby the wheel is released. Locking and releasing of the wheel can thus be carried out easily and speedily. Further the use of many holes in the ring $g'$ allows the locking of the wheel in many various positions, which is of essential practical importance especially so in automobiles, because the steering wheel cannot be moved when the vehicle stands still, at least not without seriously wearing the tires of the vehicle wheels.

Having thus fully described our invention, we claim as new and desire to secure by Letters Patent in the United States of America.

1. A lock for the steering wheel of automobiles and the like comprising a collar rotatable with the steering shaft and having a plurality of recesses arranged in a series extending circularly and concentrically with the axis of said steering shaft, a bracket disposed below but closely adjacent said collar and fixed relative to the steering post, said bracket having a guiding bore, a locking rod movably slidingly disposed in said bore, means for limiting the downward extent of movement of said locking rod to its unlocking position and means for positively locking said locking rod when moved upwardly through said bore and into one of said recesses to locked position.

2. A lock for the steering wheel of automobiles and the like comprising a collar rotatable with the steering shaft and having a downwardly disposed, annular end face provided with a plurality of recesses arranged in a series extending circularly and concentrically with the axis of said steering shaft, each of said recesses being of predetermined common contour, a bracket disposed below said collar fixed to the steering post, said bracket having a guide bore disposed closely adjacent said end face, an angularly bent locking rod extending vertically through said guide bore of said bracket, said locking rod having an upper end closely proximating said predetermined common contour, and key-operated locking means for holding said locking rod in locked position when moved upwardly through said guide bore and into one of said recesses.

In testimony whereof we have affixed our signatures in presence of two witnesses.

HALFDAN DITTMANN.
   SVEND AAGE DITTMANN.
   ROBERT CHARLES SIMMONSEN.

Witnesses:
 VIGGO BLOM,
 C. V. HÖGSTED.